(12) United States Patent
Krenz

(10) Patent No.: US 7,606,715 B1
(45) Date of Patent: Oct. 20, 2009

(54) AVIONICS SYSTEM FOR PROVIDING COMMANDS BASED ON AIRCRAFT STATE

(75) Inventor: Michael J. Krenz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 503 days.

(21) Appl. No.: 11/440,510

(22) Filed: May 25, 2006

(51) Int. Cl.
*G10L 21/00* (2006.01)
(52) U.S. Cl. ..................................................... 704/275
(58) Field of Classification Search .................. 704/275
See application file for complete search history.

(56) References Cited

U.S. PATENT DOCUMENTS

| | | | |
|---|---|---|---|
| 4,725,956 A * | 2/1988 | Jenkins | 701/2 |
| 5,926,790 A * | 7/1999 | Wright | 704/275 |
| 6,125,341 A | 9/2000 | Raud | |
| 6,745,165 B2 | 6/2004 | Lewis | |
| 6,832,152 B1 | 12/2004 | Bull | |
| 7,010,490 B2 | 3/2006 | Brocious | |
| 7,415,326 B2 * | 8/2008 | Komer et al. | 701/3 |
| 2003/0006910 A1 * | 1/2003 | Dame | 340/945 |
| 2003/0023740 A1 * | 1/2003 | White et al. | 709/230 |
| 2003/0034902 A1 * | 2/2003 | Dickau | 340/945 |

* cited by examiner

*Primary Examiner*—Michael N Opsasnick
(74) *Attorney, Agent, or Firm*—Daniel M. Barbieri

(57) ABSTRACT

An avionics system includes a dynamic grammar definition subsystem configured to receive and analyze dynamic, current aircraft state data and provide an enhanced set of recognizable current grammar data based on the aircraft state data. A voice recognition subsystem is configured to receive the current grammar data from the dynamic grammar definition subsystem and utilize the current grammar data to provide commands in response to a user's voice input based on the aircraft's dynamic, current state.

26 Claims, 1 Drawing Sheet

AVIONICS SYSTEM FOR PROVIDING COMMANDS BASED ON AIRCRAFT STATE

BACKGROUND OF THE INVENTION

1. Field of the Invention

The present invention relates generally to avionics systems, and more particularly to utilizing an enhanced grammar input for a voice recognition system to provide commands in response to a user's voice input based on the aircraft's dynamic, current state.

2. Description of the Related Art

Voice Recognition algorithms rely upon grammar and semantics to determine the best possible text match(es) to the uttered phrase(s). The aircraft operating environment is very unique in the grammar rules that are followed, and the grammar suite is rather extensive including "words" that represent unusual collections of characters (e.g. intersection or fix names). These factors make it difficult to develop a comprehensive grammar set for use on an aircraft, and this represents one of several significant challenges to bringing Voice Recognition to the cockpit.

Others have attempted to use dynamic grammar for enhancing voice recognition systems. For example, U.S. Pat. No. 6,125,341, entitled "Speech Recognition System and Method," issued to H. F. Raud et al, discloses a speech recognition system having multiple recognition vocabularies, and a method of selecting an optimal working vocabulary used by the system. Each vocabulary is particularly suited for recognizing speech in a particular language, or with a particular accent or dialect. The system prompts a speaker for an initial spoken response; receives the initial spoken response; and, compares the response to each of a set of possible responses in an initial speech recognition vocabulary to determine a response best matched in the initial vocabulary. A working speech recognition vocabulary is selected from a plurality of speech recognition vocabularies, based on the best matched response.

U.S. Pat. No. 6,745,165, entitled "Method and Apparatus For Recognizing From Here To Here Voice Command Structures in a Finite Grammar Speech Recognition System," issued to J. R. Lewis et al, discloses a method and system that uses a finite state command grammar coordinated with application scripting to recognize voice command structures for performing an event from an initial location to a new location. The method involves a series of steps, including: recognizing an enabling voice command specifying the event to be performed from the initial location; determining a functional expression for the enabling voice command defined by one or more actions and objects; storing the action and object in a memory location; receiving input specifying the new location; recognizing an activating voice command for performing the event up to the new location; retrieving the stored action and object from the memory location; and performing the event from the initial location to the new location according to the retrieved action and object. Preferably, the enabling-activating command is phrased as "from here . . . to here". The user specifies the new location with voice commands issued subsequent to the enabling command. To reduce the occurrence of unintended events, these voice commands are counted so that if they exceed a predetermined limit, the action and object content is cleared from memory.

U.S. Pat. No. 7,010,490, entitled "Method, System, and Apparatus for Limiting Available Selections in a Speech Recognition System," issued to L. A. Brocious et al, discloses a method and system for completing user input in a speech recognition system. The method can include a series of steps which can include receiving a user input. The user input can specify an attribute of a selection. The method can include comparing the user input with a set of selections in the speech recognition system. Also, the method can include limiting the set of selections to an available set of selections which can correspond to the received user input. The step of matching a received user spoken utterance with the selection in the available set of selections also can be included.

Generally, any variation in the grammar implemented in a voice recognition system is based upon previous commands or states computed within the voice recognition system. Such types of systems would have limited applicability in an avionics environment because the grammar in avionics systems is very detached and fragmented.

SUMMARY OF THE INVENTION

In a broad aspect, the present invention is an avionics system, including: a) a dynamic grammar definition subsystem configured to receive and analyze dynamic, current aircraft state data and provide an enhanced set of recognizable current grammar data based on the aircraft state data; and, b) a voice recognition subsystem configured to receive the current grammar data from the dynamic grammar definition subsystem and utilize the current grammar data to provide commands in response to a user's voice input based on the aircraft's dynamic, current state.

The aircraft environment can provide significant information enabling selective "sub setting" of the grammar rules to the situation. As used herein, the term "grammar" is defined broadly to include both vocabulary and phrase structure. Available information, including but not limited to current location, intended flight path, phase of flight, currently tuned COM frequency(ies), and type of frequency in use (i.e. Clearance Delivery, Tower, ARTCC, etc.) can be used to limit the applicable grammar for voice recognition. The list of potential waypoints may also be appropriately filtered and prioritized based upon the current aircraft environment.

For example, use of independent grammar rules for different phases of flight reduces the conflicts in the rules and allows for simpler rules to be used.

The present invention is particularly applicable for avionics systems because the grammar in such systems is detached and fragmented, and the present invention allows environmental influence to affect the dynamic grammar definition.

DETAILED DESCRIPTION OF THE INVENTION

Figure 1:
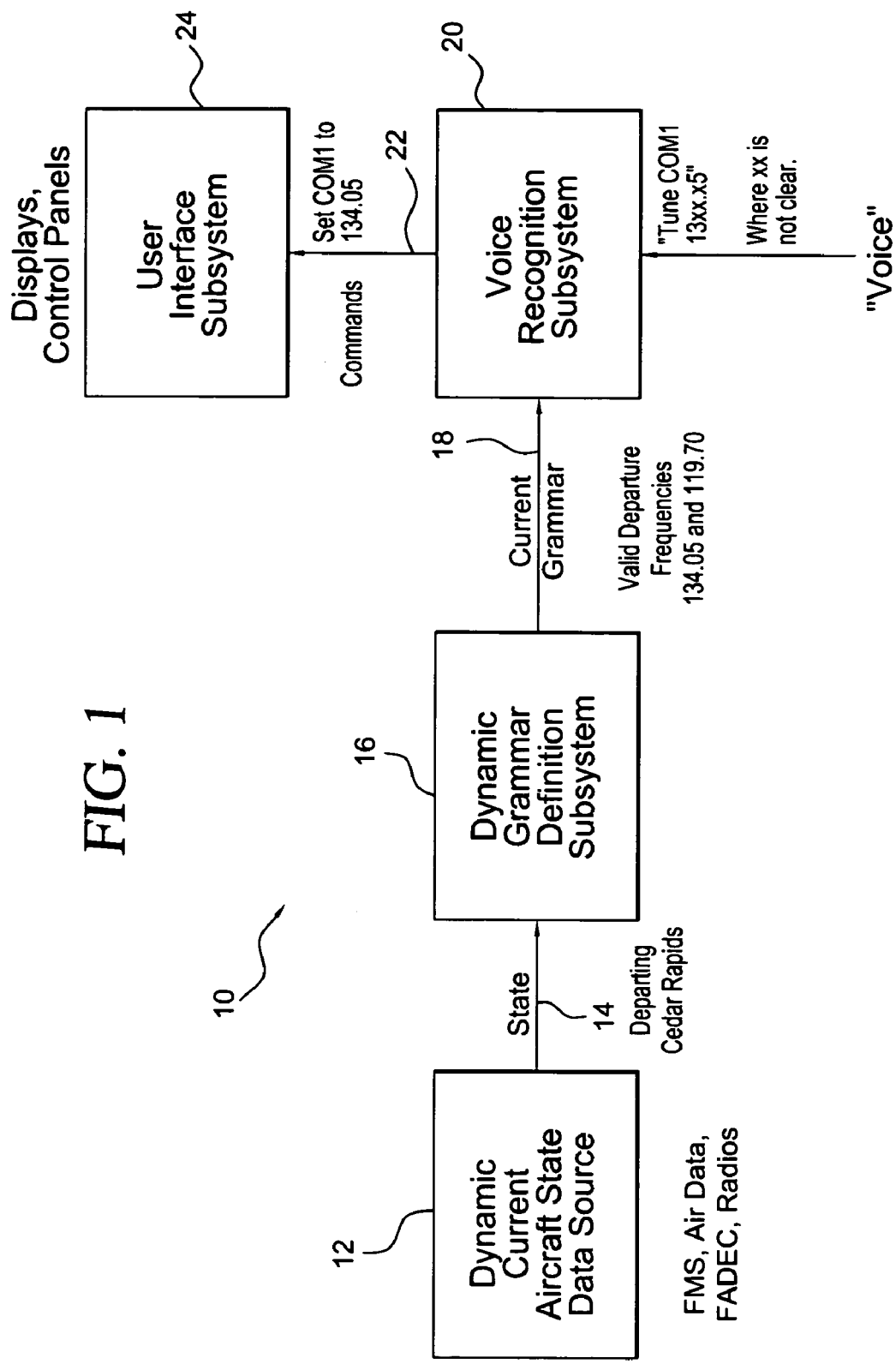
FIG. 1 is a block diagram of the avionics system of the present invention.

Referring now to the drawings and the characters of reference marked thereon, FIG. 1 illustrates an avionics system, designated generally as 10, in accordance with the principles of the present invention, in which enhanced commands are provided in response to a user's voice input based on the aircraft's dynamic, current state. A source 12 of dynamic, current aircraft state data 14 provides such state data 14 to the system 10. The state data 14 may be, for example, data from a flight management system (FMS), Full Authority Digital Engine Control (FADEC), radio, etc. It may include, for example, air data parameters, engine thrust and performance data, flight plan information, flight progress information, current radio frequency and mode information, communication radio data, navigation radio data, onboard weather radar data, uplinked weather information, uplinked flight restriction information, uplinked notice to airman (NOTAM) information, controller pilot datalink communication (CPDLC) data, company operations information, and data from other sensor and computational functions onboard the aircraft.

This state data 14 is received by a dynamic grammar definition subsystem (DGDS) 16. The DGDS 16 receives and analyzes this dynamic, current aircraft state data 14 and provides a limited set of recognizable current grammar data 18 based on the aircraft state data 14. The DGDS 16 may be a general purpose processing subsystem such as a laptop computer or an avionics computing resource.

A voice recognition (VR) subsystem 20 is configured to receive the current grammar data 18 from the DGDS 16 and utilizes the current grammar data 18 to provide enhanced commands 22 in response to a user's voice input based on the aircraft's dynamic, current state. The VR subsystem 20 may be, for example, any number of commercially available systems, such as that produced by IBM Corp. trademarked Via-Voice® software; DRAGON® software by Nuance Communications, Inc.; KURZWEIL VOICE™ software and related products by Kurzweil Applied Intelligence, Inc.; and, SAPI (Speech Application Programming Interface) speech services integrated in the Microsoft Windows operating system speech recognition software. The voice recognition system may be a keyword actuated voice recognition system. It may also include a Push-To-Recognize (P-T-R) component.

The enhanced commands 22 are received by a user interface system 24 that may include any devices in the cockpit used to provide or receive information from the user. The user interface system 24 may be, for example, appropriate displays, control panels, speakers, etc.

The grammar involved in various stages of flight is very complex, and the exact grammar definition language varies by voice recognition engine. The following examples illustrate how grammar can be optimized based upon flight state. Note that when the voice recognition engine is capable of prioritizing grammar rules, it may be desirable to include the entire grammar set at all times and dynamically adjust the priority. Another technique is to dynamically load unique grammar sets.

Clearance Delivery is a very unique and complex grammar set. The following five items are always included in a pre-departure Clearance:

C—Cleared To (e.g. "Cleared to Cedar Rapids")
R—Route (e.g. "via Radar Vectors" or "As Filed")
A—Altitude (e.g. "Maintain five thousand, expect Flight Level 220 10 minutes after departure")
F—Frequency (e.g. "Departure Frequency 134.05")
T—Transponder (e.g. "Squawk 5346")

Examples of commands issued based upon the example grammar in the preceding paragraphs may include:

Loading CID as the Destination airport in the Flight Management System.
Loading Heading (HDG) mode into the Autopilot system as the initial navigation mode.
Loading 5000 into the Altitude Preselector on the flight control system.
Loading 134.05 into the standby frequency of the active communications radio.
Loading 5346 into the Transponder squawk code on the radio tuning subsystem.

This grammar is not directly applicable in other phases of flight. Use of independent grammar rules for different phases of flight reduces the conflicts in the rules and allows for simpler rules to be used.

For example, during Taxi, the instruction set is also somewhat limited:

Taxi via xx
Hold Short [of] Runway xx[Left/Right/Center]
Contact Tower/Ground on xxx.xxx During Takeoff:

Taxi into Position and Hold Runway xx[Left/Right/Center]
Turn right/left heading xxx, cleared for takeoff runway xx [Left/Right/Center]

Thus, in summary, the method of the present invention involves receiving and analyzing dynamic, current aircraft state data via a dynamic grammar definition subsystem configured to provide an enhanced set of recognizable current grammar data based on the aircraft state data. The current grammar data from the dynamic grammar definition subsystem is received via a voice recognition subsystem configured to utilize the current grammar data to provide commands in response to a user's voice input based on the aircraft's dynamic, current state.

Other embodiments and configurations may be devised without departing from the spirit of the invention and the scope of the appended claims.

The invention claimed is:

1. An avionics system, comprising:
    a) a dynamic grammar definition subsystem configured to receive and analyze dynamic, current aircraft state data and provide an enhanced set of recognizable current, varying grammar data based on said aircraft state data; and,
    b) a voice recognition subsystem configured to receive said current, varying grammar data from said dynamic grammar definition subsystem and utilize said current, varying grammar data to provide a reduced set of commands in response to a user's voice input based on the aircraft's dynamic, current state.

2. The avionics system of claim 1, further comprising a flight management system (FMS) for providing said current aircraft state data.

3. The avionics system of claim 1, wherein said current aircraft state data is provided by a set of data selected from the group consisting of: flight management system (FMS) data, air data parameters, full authority digital engine controller (FADEC) data, communication radio data, navigation radio data, onboard weather radar data, uplinked weather information, uplinked flight restriction information, uplinked notice to airman (NOTAM) information, controller pilot datalink communication (CPDLC) data, company operations information, and data from other sensor and computational functions onboard the aircraft.

4. The avionics system of claim 1, wherein said current aircraft state data comprises position, velocity and time data.

5. The avionics system of claim 1, wherein said enhanced set of recognizable current grammar data is based on the phase of the flight.

6. The avionics system of claim 1, wherein said enhanced set of recognizable current grammar data is based on the current location.

7. The avionics system of claim 1, wherein said enhanced set of recognizable current grammar data is based on the intended flight path.

8. The avionics system of claim 1, wherein said enhanced set of recognizable current grammar data is based on the currently tuned COM frequency(ies).

9. The avionics system of claim 1, wherein said enhanced set of recognizable current grammar data is based on the type of frequency in use.

10. The avionics system of claim 1, further comprising an aircraft state data source for providing said current aircraft state data.

11. The avionics system of claim 1, further comprising a user interface subsystem for receiving said commands from said voice recognition subsystem.

12. The avionics system of claim 1, wherein said user interface subsystem sends and receives commands from other aircraft subsystems.

13. The avionics system of claim 1, wherein said enhanced set of recognizable current grammar data comprises an entire grammar set at all times with dynamically adjusted priority.

14. The avionics system of claim 1, wherein said enhanced set of recognizable current grammar data is dynamically loaded.

15. An avionics system, comprising:
   a) an aircraft state data source for providing dynamic, current aircraft state data;
   b) a dynamic grammar definition subsystem configured to receive and analyze said dynamic, current aircraft state data and provide an enhanced set of recognizable current, varying grammar data based on said aircraft state data;
   c) a voice recognition subsystem configured to receive said current, varying grammar data from said dynamic grammar definition subsystem and utilize said current, varying grammar data to provide a reduced set of commands in response to a user's voice input based on the aircraft's dynamic, current state; and,
   d) a user interface subsystem for receiving said commands from said voice recognition subsystem.

16. The avionics system of claim 15, wherein said aircraft state data source comprises a flight management system (FMS) for providing said current aircraft state data.

17. The avionics system of claim 15, wherein said aircraft state data source comprises a set of data selected from the group consisting of: flight management system (FMS) data, air data parameters, full authority digital engine controller (FADEC) data, communication radio data, navigation radio data, onboard weather radar data, uplinked weather information, uplinked flight restriction information, uplinked notice to airman (NOTAM) information, controller pilot datalink communication (CPDLC) data, company operations information, and data from other sensor and computational functions onboard the aircraft.

18. The avionics system of claim 15, wherein said current aircraft state data comprises position, velocity and time data.

19. The avionics system of claim 15, wherein said enhanced set of recognizable current grammar data is based on the phase of the flight.

20. The avionics system of claim 15, wherein said enhanced set of recognizable current grammar data is based on the current location.

21. The avionics system of claim 15, wherein said enhanced set of recognizable current grammar data is based on the intended flight path.

22. The avionics system of claim 15, wherein said enhanced set of recognizable current grammar data is based on the currently tuned COM frequency(ies).

23. The avionics system of claim 15, wherein said enhanced set of recognizable current grammar data is based on the type of frequency in use.

24. The avionics system of claim 15, wherein said enhanced set of recognizable current grammar data comprises an entire grammar set at all times with dynamically adjusted priority.

25. The avionics system of claim 15, wherein said enhanced set of recognizable current grammar data is dynamically loaded.

26. A method for providing commands based on aircraft state, comprising the steps of:
   a) receiving and analyzing dynamic, current aircraft state data via a dynamic grammar definition subsystem configured to provide an enhanced set of recognizable current, varying grammar data based on said aircraft state data; and,
   b) receiving said current, varying grammar data from said dynamic grammar definition subsystem via a voice recognition subsystem configured to utilize said current, varying grammar data to provide a reduced set of commands in response to a user's voice input based on the aircraft's dynamic, current state.

* * * * *